March 6, 1956 — F. C. ROCK, JR — 2,737,076
METHOD OF MAKING OPTICAL PRISM
Filed June 12, 1952

Inventor
Frank C. Rock Jr.
by Roberts, Cushman & Grover
att'ys.

United States Patent Office 2,737,076
Patented Mar. 6, 1956

2,737,076

METHOD OF MAKING OPTICAL PRISM

Frank C. Rock, Jr., Los Angeles, Calif., assignor to Technicolor Motion Picture Corporation, Hollywood, Calif., a corporation of Maine Application June 12, 1952, Serial No. 293,063

8 Claims. (Cl. 88—1)

This invention relates to an optical device having two intersecting coated surfaces and more particularly to a composite prism in which the two intersecting surfaces are formed by the eight interfitting faces of four wedge-shaped prisms.

One example of such a composite prism is the so-called X-prism having two internal surfaces coated with partially reflecting or similarly effective optical layers which cross each other within the prism at a predetermined angle, usually ninety degrees. Ordinarily an X-prism is prepared by coating four faces of four component triangular or wedge-shaped prisms, and then assembling and cementing the prism components together with their apexes in close juxtaposition so that the four coated faces are disposed in two planes which intersect along a line at the apexes of the assembled components, each plane comprising a pair of coated faces. When such a prism is disposed in an optical system with the partially reflecting or beam splitting layers at an angle of 45° to the optical axis, each of the layers will reflect an image in opposite directions normal to the optical axis and will transmit an image along the optical axis. If the light discriminating layers are dichroic, a plurality of separate color images may be obtained. In color photography the separation of three colored images along different axes is particularly useful with a camera having three apertures. Each of the images may be focused at its respective aperture and coincident color separation records may be obtained. It should be understood that the present invention is applicable to various light-separating devices such as neutral compound prisms having semi-transparent metallic surfaces, and is not limited to dichroic color-separating prisms.

An inherent problem in applying the aforesaid reflective coatings to an X-prism arises from the necessity of applying the coatings to the components before they are assembled and cemented. While each component may be coated separately it is highly desirable that the two faces on a pair of prism components intended to be disposed in a single plane be coated simultaneously so that when the pair of components is joined the two-part coating will be continuous across both coated faces. Since it is also desirable to cement the four components together in such a way that the layer of cement between the several prism components does not intersect the optically effective coatings it has been proposed to apply the two optically effective coatings only to two opposed components, as contrasted with adjacent components, so that those two prisms may be disposed apex to apex with the optically effective coatings in contact. In the above instance and in other instances it may be desirable to apply two coatings of different characteristics respectively to those two faces of one prism component which define the apex of the component.

Notwithstanding the desirability of so coating a prism it has been found difficult to terminate the respective coatings at the apex of the prism so that the two coatings meet without extending around the apex of the prism and overlapping each other. Owing to the sub-microscopic dimensions of light-dividing coatings and their method of production it is not possible to control their formation by observation, and owing to their fragile nature it is not possible to correct errors in their manufacture.

The object of the present invention is, therefore, to provide a novel method of coating prism components with two different coatings, so that each coating extends continuously along the respective faces of each component with the minimum of discontinuity, and so that the coatings terminate in mutual contact at the apex of each prism.

In one aspect the invention relates to the method of applying the aforesaid coatings to the faces of the components which comprises the steps of applying to one face of each of said opposite components a removable mask, for example a soluble mask, the edge of which extends only to the apexes of the respective components, contacting the masked faces with the adjacent faces of the respective prism components in alignment and applying to the aligned faces a continuous optically-effective coating such as a partially-reflecting coat, so that the coating on each of the aligned faces terminates at its apex and is prevented from extending around the apex onto the contacting faces.

In a more specific aspect the mask comprises a soluble masking substance which is applied in a fluid state and then solidified. Preferably the mask is solidified with a meniscus extending into the plane of the faces adjacent the masked faces but not touching those adjacent faces. The fluid masking substance may be applied to the faces to be contacted and distributed by tilting the respective components to flow the substance so that the meniscus is formed as aforesaid. The fluid masking substance may be applied by dipping the component into a solution parallel to the apex and then tilting so that the substance flows to the apex. It may also be applied in the form of a drop upon the surface to be masked, and the component then tilted lengthwise of the apex to extend the fluid masking substance along the apex, and then tilted crosswise of the apex to form the meniscus.

In a more specific aspect the invention comprises additional steps of separating the aforesaid masked and coated components to break the continuity of the coating between the components, dissolving the mask from the components and applying a like mask to the coated faces, then contacting the newly masked faces with the uncoated faces in alignment and depositing on the last said aligned faces a second partially-reflecting coating having a different light-reflecting characteristic, and subsequently dissolving the second mask. When the two components prepared according to this aspect of the invention are brought together in opposite positions in a compound prism with their apexes in contact the continuity of each of the two defferent coatings is substantially restored.

For the purpose of illustration a typical embodiment of the invention is shown in the accompanying drawing in which Fig. 1 is a plan view of an optical system employing an X-prism;

Figure 1:
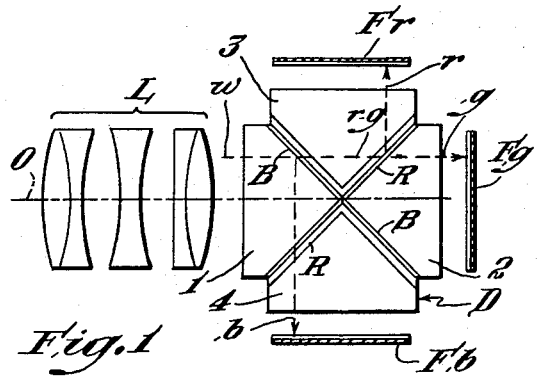

An optical system employing a device made according to the present invention is shown in Fig. 1 which diagrammatically illustrates a three-color camera having a lens L, a beam-splitting device D with an optical axis O, a green aspect negative film F$g$, a red aspect film F$r$ and a blue aspect film F$b$. The beam-splitting device or X-prism D comprises four wedge-shaped prism components or bodies 1 to 4 inclusive. Along internal surfaces of the component bodies are two plane light-dividing coatings B and R. As indicated by broken lines a ray of white light $w$, transmitted to the device D by the lens L, is split by coating B into a reflected blue ray $b$ and a transmitted minus blue ray $r-g$ which for the purpose of illustration may be considered to comprise a red and green ray. The blue ray $b$ is reflected to the blue aspect negative film F$b$. The red-green ray $r-g$ is further divided at coating R into a reflected red ray $r$ and a transmitted green ray $g$ which fall respectively on the red aspect film F$r$ and on the green aspect film F$g$.

An optical interference coating for the purposes of the camera arrangement shown in Fig. 1 may comprise a series of alternating layers of lead fluoride and zinc sulphide. While the number of layers is not critical, a fairly high number is preferable in order to provide high reflection intensities and steep spectral cuts. In a successful practical embodiment reflecting coatings of one or more layers have been used. The coatings may be applied by appropriate evaporation methods as by alternately volatizing the sulphide and fluoride in a vacuum and condencing the vaporized materials in successive submicroscopic films or layers on the desired faces of the prism components. The color which the dichroic coating reflects is dependent upon the thickness of the individual layers of the coating. Generally speaking the individual layers of fluoride and sulphide have an optical thickness of approximately one-quarter of the wave length of the spectral band to be reflected or an odd multiple thereof. After the dichroic coatings have been applied the four prism components are cemented together with a suitable optical cement.

Preferably the coatings are applied to only two of the four components, and only to those two components which are directly opposed to each other after the device has been cemented, for example to components 1 and 2.

Figure 3:
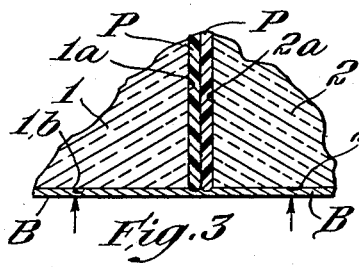
Fig. 3 is an enlarged sectional view showing one step of applying a light-reflecting coating.
Figure 4:
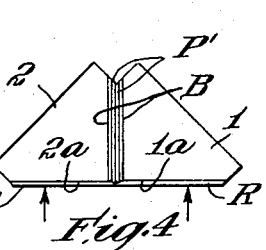
Fig. 4 is an end view showing another step in the coating.

Figs. 3 and 4 illustrate the steps by which the coatings are applied. In a manner to be more fully described protective resinous masks P are first applied to faces 1$a$ and 2$a$ of the two opposite prism components, 1 and 2 respectively. The two opposed components are then placed together with the masked faces 1$a$ and 2$a$ in contact with faces 1$b$ and 2$b$, to which the blue reflecting coating B is to be applied, in alignment. Alternate layers of sulphide and fluoride are applied to the faces 1$b$ and 2$b$. The components 1 and 2 are then separated breaking the coating B. The masks P are then removed and like masks P' are applied to faces 1$b$ and 2$b$. The prisms are reoriented so that the masked surfaces P' are opposed to each other while the faces remaining to be coated, namely faces 1$a$ and 2$a$ are aligned as shown in Fig. 4. Alternate layers of zinc sulphide and lead fluoride are then applied by evaporation to the aligned faces 1$a$ and 2$a$, the thickness of these layers being in general different from those in the blue reflecting coating previously described.

Figure 9:
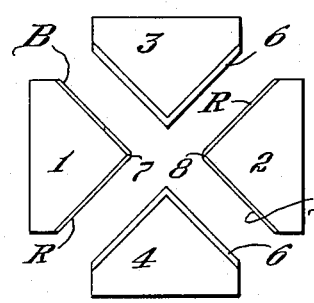
Fig. 9 is a plan view showing the method of assembly of the X-prism.
Figures 8, 10:
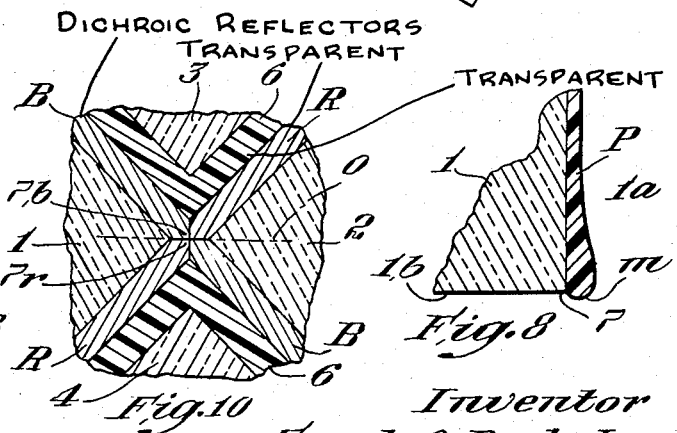
Fig. 8 is a sectional view showing an enlarged detail of the mask.
Fig. 10 is a sectional view showing enlarged details of the assembled X-prism.

The prisms thus prepared are shown in their relative positions in Fig. 9, the coated surfaces B and R being carried on two opposed prisms 1 and 2 only. A coating of cement 6 is applied to the internal faces of prism components 3 and 4 although it may be applied to all of the internal surfaces if desired. The four component prisms are then carefully assembled in a jig and aligned with the internal edges 7 and 8 of prism components 1 and 2 respectively brought into contact, and the assembly held in this position until the cement sets.

According to the present invention each of the protective masks P and P' is applied to each component so that the edge $m$ of the mask adjacent the apex 7 defined by the faces of the component extends to the apex so as fully to cover the edge of the face along the apex without extending around the apex. For this reason the mask is applied in liquid form and subsequently hardened. The liquid may comprise a monomeric resin which may be hardened by polymerization, or preferably a dilute solution of a polymeric resin in a volatile solvent. The polymer should have a very low vapor pressure, preferably under $1 \times 10^{-6}$ mm. of Hg, in order that it will not contaminate the light-dividing coating during the process of evaporation in vacuum. The solvent should be an organic liquid in which the selected polymer will dissolve, which has a high enough vapor pressure, preferably over 1 mm. of Hg in order to be completely removable from the mask, which has a greater molecular adhesion to glass than cohesion so that the solution will wet the glass surfaces of the prism components, and which is relatively non-toxic. A successful masking material is a five to fifteen percent solution of polyisobutyl methacrylate or polycyclohexyl methacrylate in xylene. Among other suitable materials are ethyl methacrylate, methyl methacrylate and styrene. The dissolved masking materials may be solidified by evaporation at normal temperatures or more preferably by heating in an oven at a temperature of 60 to 70 degrees centigrade. If a monomeric resin is used polymerization may be accelerated by adding to the solution a catalyst such as benzyl peroxide in a suitable proportion, for example three tenths of one percent.

Any one of the above solutions has a surface tension sufficient to form a meniscus on a glass surface such as that of the prisms, and the invention further comprises forming a meniscus at the portion of each mask adjacent the apex of the components.

Figure 2:
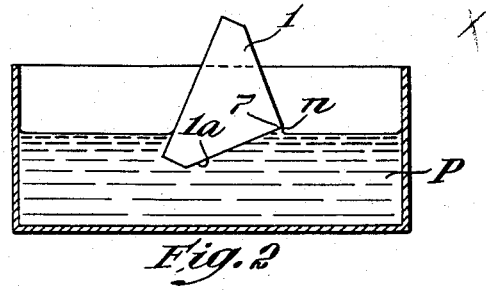
Fig. 2 is a diagrammatic view showing one method of applying a mask.

As shown in Fig. 2 the mask is applied and the meniscus formed by dipping the prism into the solution of resin. The prism component 1 is held so that the surface 1$a$ to be masked will intersect the liquid surface at an angle between 10 to 70 degrees. It is then slowly lowered into the solution as the liquid which wets the glass advances up the component toward its apex 7 until a concave meniscus $n$ is formed at the apex. The component 1 is then removed from the solution and held tipped toward its apex by any suitable support S. The solution will run toward the apex and form a convex meniscus $m$ along the edge of the face 1$a$, which retains its shape when the resin hardens. Preferably the meniscus $m$ extends into the plane of the unmasked face 1$b$ without overlapping the apex 7 onto that face 1$b$.

Figure 5:
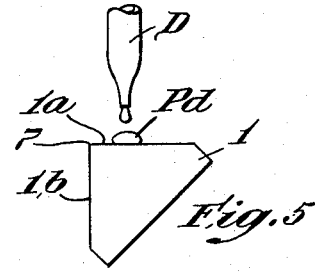
Figs. 5 and 6 are diagrammatic views showing an alternate method of applying a mask.
Figure 7:
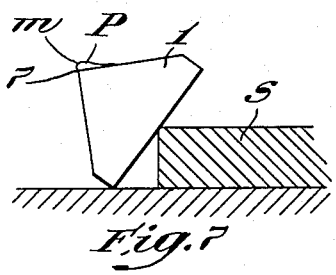
Fig. 7 is a side view showing a further step in applying the mask.
Figure 6:
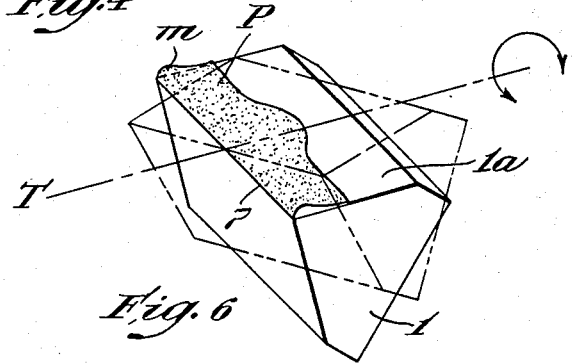

An alternate method of applying the mask, shown in Figs. 5 and 6, comprises applying a droplet P$d$ of the resinous solution downwardly onto the surface 1$a$ to be masked, as in Fig. 5, and tilting the component on an axis T at right angles to the apex 7 to distribute the solution lengthwise of the apex. The prism is then tilted toward the apex as in Fig. 7 to form the meniscus $m$.

Subsequent to the application of each light-dividing coating the masks are removed, preferably by means of a selective solvent which dissolves the mask without adversely affecting the coatings. Xylene is suitable for this purpose. Since the edge of the masks have supported a thin strip of the light-dividing coating which extends beyond the apex or beyond the juncture of one coating with the coating on the adjacent face removal of the mask by dissolving will break off this extending strip evenly parallel to the apex.

While the optically effective layers may be applied to either pair of opposed prism components, it is preferable to apply them to the two components on opposite sides of the optical axis, rather than the two components on said axis, thereby to avoid undesirable discontinuities in the ray transmitted by the prism.

A prism prepared according to the present invention produces substantially no aberration or discontinuity in the separation negatives of a motion picture camera. However, it should be understood that I do not wish to limit the use of the prism to cinematography since it may also be used in other beam linking devices such as three-color television transmitters and receivers, or other modifications or equivalents which fall within the scope of the appended claims.

I claim:

1. In the optical art of making a compound prism with two transparent, right-angle prisms having two of their right-angle faces joined together and the other two right-angle faces aligned in the same plane and covered with a coating of light-reflecting material, the method which comprises temporarily joining the two prisms together in the aforesaid relationship with masking substance therebetween which is impervious to said material but which can be dissolved off, applying a continuous coating of said material to said aligned faces, separating the components, dissolving off said masking substance, and rejoining the components with the same faces in alignment as before, whereby said light-reflecting coating covers the aligned faces without substantial interruption at the junction between the aligned faces and during application is prevented by said masking substance from extending around the corners of the components on the opposed faces of the components.

2. The method according to claim 1 characterized by the steps of applying said masking substance to said faces in fluid form, flowing said substance to said corners, and solidifying the mask on said faces.

3. The method according to claim 2 further characterized in that a meniscus of said fluid masking substance is formed at said corners.

4. The method according to claim 3 characterized in that each of said components is tilted so as to flow said substance to said corner and there form said meniscus.

5. The method according to claim 4 further characterized in that said component is tilted lengthwise of the corner and crosswise of the corner.

6. The method according to claim 5 further characterized in that the masking substance is applied in the form of a drop.

7. The method according to claim 2 further characterized by the steps of separating the components and the light-reflecting coatings thereon, and dissolving the masking substance to remove the coating adhering thereto without damaging the part of the coating applied to the aligned faces.

8. In the optical art of making a compound prism with two transparent prisms each having a right-angle corner and having two of their right-angle faces joined together and the other two right-angle faces aligned in the same plane and covered with a coating of light-reflecting material, the method which comprises applying to the faces to be joined a temporary coating of masking substance which is impervious to said material but which can be dissolved off, said coating being applied so that it extends to but not around said corners, temporarily joining the two prisms together in the aforesaid relationship with said masking substance therebetween, applying a continuous coating of said material to said aligned faces, separating the components, dissolving off said masking substance, and rejoining the components in alignment as before, whereby said light-reflecting coating covers said aligned faces without substantial interruption at the junction between the aligned faces and is prevented by said masking substance from extending around the corners of the components on the opposed faces of the components.

References Cited in the file of this patent

UNITED STATES PATENTS

| | | |
|---|---|---|
| 2,139,640 | Mall | Dec. 6, 1938 |
| 2,361,514 | Tillyer | Oct. 31, 1944 |
| 2,487,063 | Marks | Nov. 8, 1949 |
| 2,559,969 | Kennedy | July 10, 1951 |
| 2,563,936 | Huntsberger | Aug. 14, 1951 |
| 2,604,418 | Stern | July 22, 1952 |
| 2,642,487 | Schroeder | June 16, 1953 |

FOREIGN PATENTS

| | | |
|---|---|---|
| 13,042 | Great Britain | Sept. 11, 1915 |
| 475,415 | Great Britain | Nov. 15, 1937 |
| 586,957 | Great Britain | Apr. 9, 1947 |